US008614982B2

(12) United States Patent  
Abeta et al.

(10) Patent No.: US 8,614,982 B2
(45) Date of Patent: Dec. 24, 2013

(54) NETWORK APPARATUS, COMMUNICATION APPARATUS, COMMUNICATION CONTROL METHOD, AND COMMUNICATION CONTROL SYSTEM

(75) Inventors: Hidetoshi Abeta, Fukuoka (JP);
Kazuhiro Muraoka, Fukuoka (JP);
Tomohide Yamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 13/154,720

(22) Filed: Jun. 7, 2011

(65) Prior Publication Data

US 2011/0235612 A1   Sep. 29, 2011

Related U.S. Application Data

(63) Continuation of application No. PCT/JP2008/073485, filed on Dec. 24, 2008.

(51) Int. Cl.
*H04W 4/00* (2009.01)
*H04J 3/24* (2006.01)

(52) U.S. Cl.
USPC ............................ 370/329; 370/341; 370/473

(58) Field of Classification Search
USPC .......................................... 370/329, 473, 341
See application file for complete search history.

(56) References Cited

U.S. PATENT DOCUMENTS

| 2006/0221926 | A1 | 10/2006 | Maekawa et al. |
| 2007/0183451 | A1* | 8/2007 | Lohr et al. ................ 370/473 |
| 2008/0205365 | A1* | 8/2008 | Russell et al. ............ 370/341 |
| 2010/0215004 | A1* | 8/2010 | Yoo .......................... 370/329 |

FOREIGN PATENT DOCUMENTS

| JP | 2002-300172 | 10/2002 |
| JP | 2005-523616 | 8/2005 |
| JP | 2006-229778 | 8/2006 |
| JP | 2006-295869 | 10/2006 |
| WO | 03/090037 | 10/2003 |
| WO | 2008/124434 | 10/2008 |

OTHER PUBLICATIONS

International Search Report dated Jan. 27, 2009, from corresponding International Application No. PCT/JP2008/073485.
Notice of Rejection dated Feb. 19, 2013, from corresponding Japanese Application No. 2010-543665.

(Continued)

*Primary Examiner* — Ian N Moore
*Assistant Examiner* — Kiet Tang
(74) *Attorney, Agent, or Firm* — Katten Muchin Rosenman LLP

(57) ABSTRACT

A network station stores therein a frame scheduling table including a plurality of pieces of scheduling information obtained by scheduling, in advance, transmission/reception timing of wireless frames that are transmitted/received by wireless communication terminals each of which is configured so as to implement a plurality of wireless communication methods, while using a wireless communication method corresponding to the network side and while using a wireless communication method corresponding to the local side. When the network station receives a notification indicating that a radio wave interference is detected, from any of the wireless communication terminals managed by the network station, the network station changes the frame scheduling information currently assigned to the wireless communication terminal being the transmission source of the notification indicating that the radio wave interference is detected.

5 Claims, 11 Drawing Sheets

(56) References Cited

OTHER PUBLICATIONS

Chi-Chen Lee, et al. "Sub-frame based Multi-Radio Coexistence Control Mechanism for IEEE 802.16m" IEEE, Sep. 9, 2008, retrieved from http://grouper.ieee.org/groups/802/16/tgm/contrib/C80216m-08_1028r1.pdf.

Jing Zhu, et al. "Co-Located Multi-Radio Coexistence Design Considerations" IEEE, Sep. 11, 2008, retrieved from http://grouper.ieee.org/groups/802/16/tgm/contrib/S80216m-08_897r2.pdf.

Shashikant Maheshwari, et al. "Collocated Multi-Radio Coexistence for 802.16m—Considerations and Proposals" IEEE, Sep. 9, 2008, retrieved from http://www.ieee802.org/16/tgm/contrib/C80216m-08_1083r2.ppt.

* cited by examiner

FIG.3

| DEVICE TYPE | NUMBER OF TIMES OF COLLISIONS | DETECTION SECTION (ms) |
|---|---|---|
| LOCAL-SIDE DEVICE 1 | (e.g., 5) | (e.g., 200) |

| DEVICE TYPE | NUMBER OF TIMES BUSY STATE IS DETECTED | DETECTION SECTION |
|---|---|---|
| LOCAL-SIDE DEVICE 2 | (e.g., 1) | (e.g., 100) |

FIG.4

| TERMINAL IDENTIFIER | INTERFERENCE POSSIBILITY (YES/NO) | GROUP NUMBER |
|---|---|---|
| 0x0010 | YES | 1 |
| 0x00ac | NO | - |
| 0x0005 | NO | - |
| 0x003c | YES | 1 |
| 0x005a | YES | 0 (default) |
| 0x0111 | YES | 2 |
| 0x001e | YES | 2 |
| 0x005a | NO | - |
| 0x0005 | YES | 3 |
| 0x001c | YES | 3 |
| . | . | . |
| . | . | . |
| . | . | . |

FIG.5

| GROUP NUMBER | RATIO BETWEEN NETWORK SIDE AND LOCAL SIDE | FRAME WITH WHICH NETWORK STATION TRANSMISSION IS STARTED | NUMBER OF TIMES TRANSMISSION IS CONTINUED (FRAMES) |
|---|---|---|---|
| 0 | (e.g., 1: 1) | (e.g., EVEN-NUMBERED FRAME) | (e.g., 1000) |
| 1 | (e.g., 1: 1) | (e.g., ODD-NUMBERED FRAME) | (e.g., 1000) |
| 2 | (e.g., 2: 1) | (e.g., EVEN-NUMBERED FRAME) | (e.g., 1000) |
| 3 | (e.g., 2: 1) | (e.g., ODD-NUMBERED FRAME) | (e.g., 1000) |
| 4 | (e.g., 3: 1) | (e.g., EVEN-NUMBERED FRAME) | (e.g., 1000) |
| 5 | (e.g., 3: 1) | (e.g., ODD-NUMBERED FRAME) | (e.g., 1000) |
| 6 | (e.g., 3: 1) | (e.g., 3n) | (e.g., 3000) |
| 7 | · | (e.g., 3n+1) | (e.g., 3000) |
| · | · | · | · |

US 8,614,982 B2

NETWORK APPARATUS, COMMUNICATION APPARATUS, COMMUNICATION CONTROL METHOD, AND COMMUNICATION CONTROL SYSTEM

CROSS-REFERENCE TO RELATED APPLICATIONS

This application is a continuation of International Application No. PCT/JP2008/073485, filed on Dec. 24, 2008, the entire contents of which are incorporated herein by reference.

FIELD

The embodiments discussed herein are directed to a network apparatus, a communication apparatus, a communication control method, and a communication control system.

BACKGROUND

On the basis of the Institute of Electrical and Electronics Engineers (IEEE) 802.16e Standard (hereinafter, "WiMAX": Worldwide Interoperability for Microwave Access), which is in the process of being standardized as a specification for a high-speed wireless network to realize a next-generation mobile communication system, communication device manufacturers and operators in various countries have been performing mutual connection tests and field trials to achieve commercialization, which is now realized.

For example, there are techniques for wirelessly transferring sound data by using wireless communication techniques intended for relatively short distance communications, such as Bluetooth (registered trademark). Examples of utilization modes of WiMAX described above include a mode using such a technique. For example, as depicted in FIG. 11, a wireless communication terminal (e.g., a portable terminal) using WiMAX wirelessly transfers data received from the wireless network side to another device (e.g., a headset) connected to the wireless communication terminal and positioned nearby. FIG. 11 is an exemplary configuration of a conventional wireless communication system.

Further, according to the wireless communication technique described above, if a plurality of communication terminals using mutually-different wireless communication methods perform communication while using mutually the same frequency band, there may be a situation where a radio wave interference occurs between the terminals and the communication performance may be degraded. To cope with this situation, for example, Japanese Laid-open Patent Publication No. 2002-300172 proposes a technique for inhibiting degradation of communication performance caused by a radio wave interference that occurs when a plurality of communication terminals using mutually-different wireless communication methods use mutually the same frequency band.

A wireless communication terminal that uses a plurality of wireless communication methods such as Bluetooth and WiMAX described above has a possibility of having a communication failure because of a radio wave interference occurring inside the terminal.

For example, the width of the available frequency range between the frequency bands "2.3 GHz and 2.5 GHz" used by WiMAX and the frequency band "2.4 gigahertz" used by Bluetooth is small. Accordingly, a wireless communication terminal configured so as to implement both WiMAX and Bluetooth has a possibility of having a radio wave interference on the inside of the terminal, WiMAX being a wireless communication method intended for external communications such as a communication with a wireless network and Bluetooth being a wireless communication method intended for an inter-device connection such as a communication with a device at a relatively short distance. As a result, a communication terminal that uses a plurality of wireless communication methods has a possibility of having a communication failure caused by a radio wave interference occurring inside the terminal.

To address the problem described above, techniques that can be used for avoiding such radio wave interferences occurring on the inside of wireless communication terminals have also been discussed. More specifically, as depicted in FIG. 12, a communication period width is defined while using WiMAX communication as a reference axis, so that a schedule is prepared in which sections during which WiMAX communication is performed and sections during which Bluetooth communication ("BT" in FIG. 12) is performed are time-shared. Based on the prepared schedule, the output of the frequency is stopped on the side corresponding to the wireless communication method by which no communication is performed, so that it is possible to avoid radio wave interferences that may occur on the inside of the terminal (called "co-existence function"). FIG. 12 is a scheduling example in which the sections during which WiMAX communication is performed and the sections during which Bluetooth communication is performed are time-shared.

According to the proposed technique described above, however, another problem as described below arises: It is reported that the maximum communication distance of WiMAX is tens of kilometers, whereas the maximum communication distance of Bluetooth is 100 meters. When communication is performed at the same time within a small area of a number of meters by a plurality of wireless communication terminals each of which is configured with a function of avoiding, on the inside thereof, internal interferences between the WiMAX communication and the Bluetooth communication, as depicted in FIG. 13, there is a possibility that a radio wave interference may occur between the WiMAX communication frequency and the Bluetooth communication frequency from the two different wireless communication terminals. FIG. 13 is a drawing for explaining the problem with the conventional example.

SUMMARY

According to an aspect of an embodiment of the invention, a network apparatus includes a scheduling information storage unit that stores therein a plurality of pieces of scheduling information for scheduling in advance transmission and reception timing of wireless frames that are transmitted and received by a plurality of communication apparatuses, the wireless frames including a wireless frame transmitted and received using a wireless communication method for a network side and a wireless frame transmitted and received using a wireless communication method for a local side; a scheduling information assigning unit that assigns one of the pieces of scheduling information stored in the scheduling information storage unit to a communication apparatus managed by the network apparatus; a scheduling information notifying unit that notifies the communication apparatus of the piece of scheduling information assigned by the scheduling information assigning unit; and a radio wave interference notification receiving unit that receives a notification indicating that a radio wave interference is detected from the communication apparatus. When the radio wave interference notification receiving unit receives the notification indicating that the radio wave interference is detected, the scheduling information assigning unit selects another one of the pieces of scheduling information that is different from the piece of scheduling information currently assigned to the communication apparatus that has transmitted the notification, and newly assigns the selected piece of scheduling information to the communication apparatus that has transmitted the notification. The scheduling information notifying unit notifies the communication apparatus that has transmitted the notification of the piece of scheduling information newly assigned by the scheduling information assigning unit.

According to another aspect of an embodiment of the invention, a communication apparatus includes a radio wave interference transmitting unit that, when wireless communication quality on a local side satisfies a predetermined condition, transmits a notification indicating that a radio wave interference is detected, to a network apparatus; and a communication control unit that, based on scheduling information provided by the network apparatus, transmits and receives wireless frames using wireless communication methods for a network side and for the local side.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table with examples of radio wave interference detection conditions according to the first embodiment;

FIG. 4 is an exemplary configuration of a terminal management table according to the first embodiment;

FIG. 5 is an exemplary configuration of a frame scheduling table according to the first embodiment;

DESCRIPTION OF EMBODIMENTS

Preferred embodiments of the present invention will be explained with reference to accompanying drawings. One of the preferred embodiments will be explained as a first embodiment of the present invention while using examples of a network station that functions as the network apparatus and a wireless communication terminal that functions as the communication apparatus.

[a] First Embodiment

Figure 1:
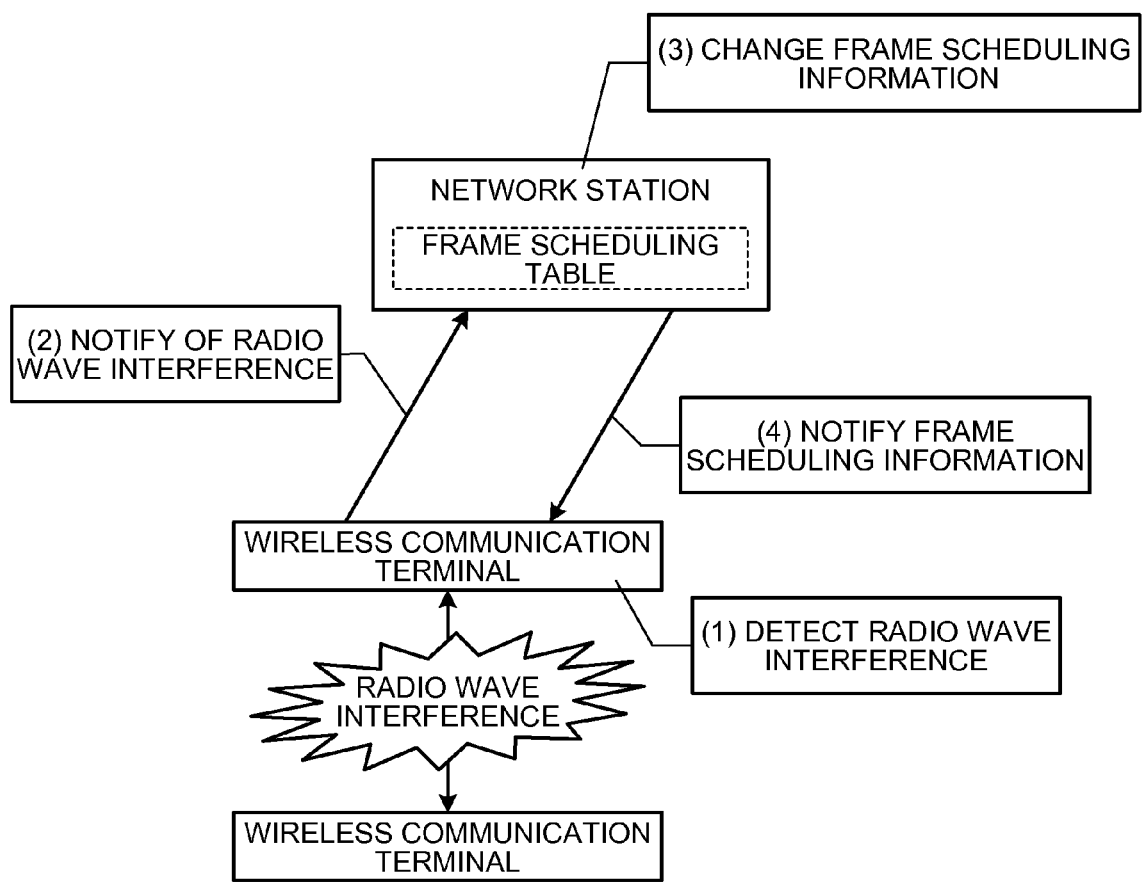
FIG. 1 is an exemplary diagram for explaining a network station according to a first embodiment of the present invention.

FIG. 1 is an exemplary diagram for explaining the network station according to the first embodiment. An outline of the network station according to the first embodiment will be briefly explained below.

The network station stores therein a frame scheduling table including a plurality of pieces of scheduling information obtained by scheduling, in advance, transmission/reception timing of wireless frames that are transmitted/received by the wireless communication terminal configured so as to implement a plurality of wireless communication methods, while using a wireless communication method corresponding to the network side and while using a wireless communication method corresponding to the local side.

Further, when the wireless communication terminal detects a radio wave interference occurring because, for example, another wireless communication terminal is positioned nearby (see (1) of FIG. 1), the wireless communication terminal transmits a notification indicating that a radio wave interference is detected, to the network station (see (2) of FIG. 1).

When the network station receives a notification indicating that a radio wave interference is detected, from any of the wireless communication terminals that are managed by the network station, the network station changes frame scheduling information currently assigned to the wireless communication terminal being the transmission source of the notification indicating that a radio wave interference is detected (see (3) of FIG. 1). Further, the network station notifies the wireless communication terminal being the transmission source of the notification indicating that a radio wave interference is detected of the new frame scheduling information resulting from the change (see (4) of FIG. 1).

Configurations of Apparatuses

First Embodiment

Figure 2:
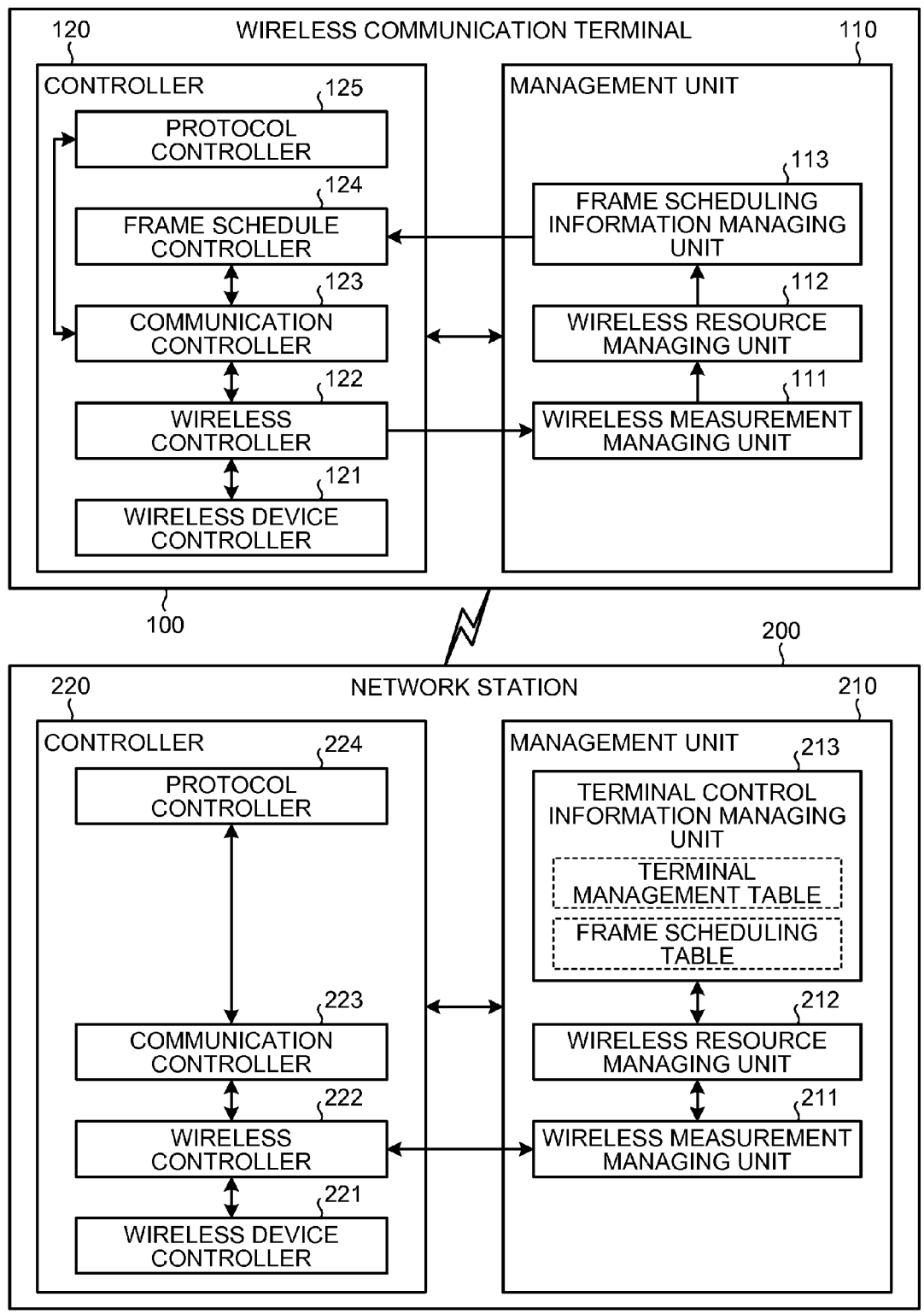
FIG. 2 is an exemplary diagram of apparatus configurations according to the first embodiment.

FIG. 2 is an exemplary diagram of apparatus configurations according to the first embodiment. As depicted in FIG. 2, a wireless communication terminal 100 includes a management unit 110 and a control unit 120.

The management unit 110 includes a wireless measurement managing unit 111, a wireless resource managing unit 112, and a frame scheduling information managing unit 113.

The wireless measurement managing unit 111 receives, from a wireless device controller 121 (explained later), and manages measurement results regarding quality of wireless radio waves and a status of frame transmissions/receptions. Further, the wireless measurement managing unit 111 stores therein, in advance, detection conditions used for detecting a radio wave interference based on the status of frame transmissions/receptions, in correspondence with different types of local-side devices (e.g., a headset) to and from which the wireless communication terminal 100 transmits/receives frames by using Bluetooth. Further, by comparing the measurement results received from the wireless device controller 121 with the detection conditions, the wireless measurement managing unit 111 detects, if any, radio wave interferences experienced by the wireless communication terminal 100.

More specifically, based on the measurement results provided by the wireless device controller 121, the wireless measurement managing unit 111 checks how many times a frame transmission failure occurred in the communication with the local-side device (e.g., the headset) per unit time period (e.g., 200 milliseconds) used as a predetermined detection section. Further, by comparing the learned number of times of the frame transmission failure with the detection conditions, the wireless measurement managing unit 111 tries to detect, if any, radio wave interferences. When detecting a radio wave interference, the wireless measurement managing unit 111 transmits a notification indicating that a radio wave interference is detected to a network station 200.

Examples of the detection conditions that are stored, in advance, in the wireless measurement managing unit 111 and are used for detecting the radio wave interferences include, as illustrated in FIG. 3, the number of times (e.g., 5) a collision occurred in the communication with a local-side device 1 per unit time period (e.g., 200 milliseconds) used as a predetermined detection section. As another example of the detection conditions used for detecting radio wave interferences, the wireless measurement managing unit 111 stores therein, as illustrated in FIG. 3, the number of times (e.g., 1) a "busy state" was detected in the communication with a local device 2 per unit time period (e.g., 100 milliseconds) used as a predetermined detection section. FIG. 3 is a table with examples of the radio wave interference detection conditions according to the first embodiment.

The wireless resource managing unit 112 manages all the wireless communication methods (i.e., wireless types), such as WiMAX and Bluetooth, used by the wireless communication terminal 100.

When the power source of the wireless communication terminal 100 is turned on, the frame scheduling information managing unit 113 searches for a network station. When having detected the network station 200, the frame scheduling information managing unit 113 checks all the wireless resources managed by the wireless resource managing unit 112 and, if there is a possibility of having a radio wave interference, the frame scheduling information managing unit 113 transmits a notification indicating that there is a possibility of having a radio wave interference, to the network station 200.

Further, the frame scheduling information managing unit 113 receives, from the network station 200, and manages the frame scheduling information obtained by scheduling, in advance, the transmission/reception timing of the wireless frames that are transmitted/received while using WiMAX, which is a wireless communication method corresponding to the network side, and the wireless frames that are transmitted/received while using Bluetooth, which is a wireless communication method corresponding to the local side.

As depicted in FIG. 2, the control unit 120 includes the wireless device controller 121, a wireless controller 122, a communication controller 123, a frame schedule controller 124, and a protocol controller 125. The wireless device controller 121 controls different types of wireless devices and provides the wireless measurement managing unit 111 with the measurement results obtained by measuring the radio wave quality and the status of the frame transmissions/receptions of the wireless devices.

The wireless controller 122 exercises state control according to the wireless communication method (i.e., the wireless type) being used. The communication controller 123 controls the frame transmissions/receptions. The frame schedule controller 124 refers to the frame scheduling information managed by the frame scheduling information managing unit 113 and controls the transmission/reception timing of the frames that are transmitted/received by using mutually-different wireless communication methods. The protocol controller 125 exercises protocol control over the communication with the network station 200.

Further, as depicted in FIG. 2, the network station 200 includes a management unit 210 and a control unit 220. The management unit 210 includes a wireless measurement managing unit 211, a wireless resource managing unit 212, and a terminal control information managing unit 213.

The wireless measurement managing unit 211 receives, from a wireless device controller 221 (explained later), and manages measurement results regarding the quality of wireless radio waves and a status of frame transmissions/receptions. The wireless resource managing unit 212 manages all the wireless communication methods (i.e., wireless types) used by the network station 200.

The terminal control information managing unit 213 manages a terminal management table recording therein information used for managing the wireless communication terminals 100 that are managed by the network station 200. For example, as depicted in FIG. 4, the terminal management table has recorded therein the following pieces of information that are kept in correspondence with one another: terminal identifiers that are assigned, in a one-to-one correspondence, to the wireless communication terminals 100 managed by the network station 200; information indicating whether there is a possibility of having a radio wave interference; and group numbers assigned to the wireless communication terminals 100 belonging to the network station 200. FIG. 4 is an exemplary configuration of the terminal management table according to the first embodiment.

Further, the terminal control information managing unit 213 manages a frame scheduling table including a plurality of pieces of frame scheduling information obtained by scheduling, in advance, transmission/reception timing of wireless frames that are transmitted/received by each of the wireless communication terminals 100 while using WiMAX, which is a wireless communication method corresponding to the network side, and wireless frames that are transmitted/received by each of the wireless communication terminals 100 while using Bluetooth, which is a wireless communication method corresponding to the local side.

For example, as depicted in FIG. 5, the frame scheduling table keeps the following pieces of information in correspondence with one another: the group numbers (e.g., numerals such as "0", "1", and "2") assigned to the wireless communication terminals 100 belonging to the network station 200; the ratios between the frames transmitted/received by the wireless communication terminal 100 on the network side and the frames transmitted/received on the local side (e.g., network side:local side=1:1); information indicating a frame with which the transmission is started on the network station 200 side (e.g., an even-numbered frame, an odd-numbered frame, or a "multiple of 3"th frame); and the number of times the frames are continuously transmitted (e.g., 1000 times). FIG. 5 is an exemplary configuration of the frame scheduling table according to the first embodiment.

Upon receipt of the notification indicating that there is a possibility of having a radio wave interference from any of the wireless communication terminals 100 belonging to the network station 200, the terminal control information managing unit 213 registers into the terminal management table and manages: the terminal identifier (e.g., "0x005a"; see FIG. 4) of the wireless communication terminal 100 being the transmission source of the notification; information "YES" indicating that there is a possibility of having a radio wave interference (see FIG. 4); and an arbitrary group number assigned to the wireless communication terminal 100 (e.g., a default value "0" assigned when the wireless communication terminal 100 belongs to the network station 200; see FIG. 4).

Further, out of the frame scheduling table, the terminal control information managing unit 213 obtains the frame scheduling information (e.g., the ratio between the network side and the local side="1:1"; the frame with which the network station transmission is started is an "even-numbered frame"; and the number of times the frame transmission is continued is "1000"; see FIG. 5) that is kept in correspondence with the group number assigned to the wireless communication terminal 100 and transmits the obtained frame scheduling information to the wireless communication terminal 100 being the transmission source of the notification indicating that there is a possibility of having a radio wave interference.

Further, upon receipt of the notification from the wireless communication terminal 100 indicating that a radio wave interference is detected, the terminal control information managing unit 213 refers to the terminal management table and changes the group number (e.g., "0") currently assigned to the wireless communication terminal 100 being the transmission source of the notification, to another group number (e.g., "2"; see FIG. 4).

Further, out of the frame scheduling table, the terminal control information managing unit 213 obtains the frame scheduling information (e.g., the ratio between the network side and the local side="2:1"; the frame with which the network station transmission is started is an "even-numbered frame"; and the number of times the frame transmission is continued is "1000"; see FIG. 5) that is kept in correspondence with the new group number resulting from the change and transmits the obtained frame scheduling information to the wireless communication terminal 100 being the transmission source of the notification indicating that a radio wave interference is detected.

The terminal control information managing unit 213 notifies a wireless controller 222 of the frame scheduling information transmitted to the wireless communication terminal 100.

As depicted in FIG. 2, the control unit 220 includes the wireless device controller 221, the wireless controller 222, a communication controller 223, and a protocol controller 224. The wireless device controller 221 controls different types of wireless devices. The wireless controller 222 exercises state control according to the wireless communication method (i.e., the wireless type) being used, based on the frame scheduling information provided by the terminal control information managing unit 213. The communication controller 223 controls the frame transmissions/receptions. The protocol controller 224 exercises protocol control over the communication with the wireless communication terminals 100.

Processes Performed Between Apparatuses

First Embodiment

Figure 6:
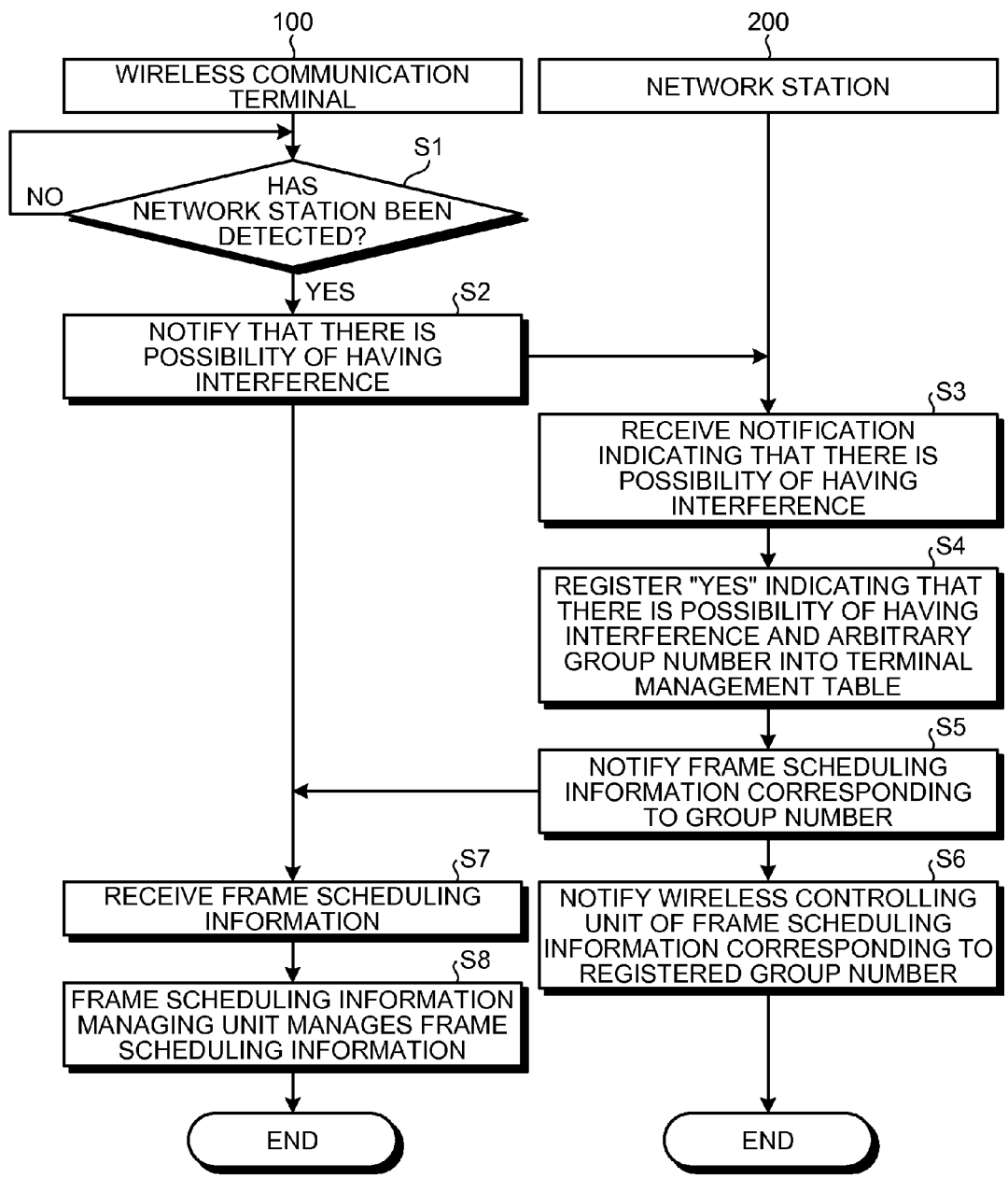
FIG. 6 is an exemplary flowchart of processes performed between apparatuses according to the first embodiment.
Figure 7:
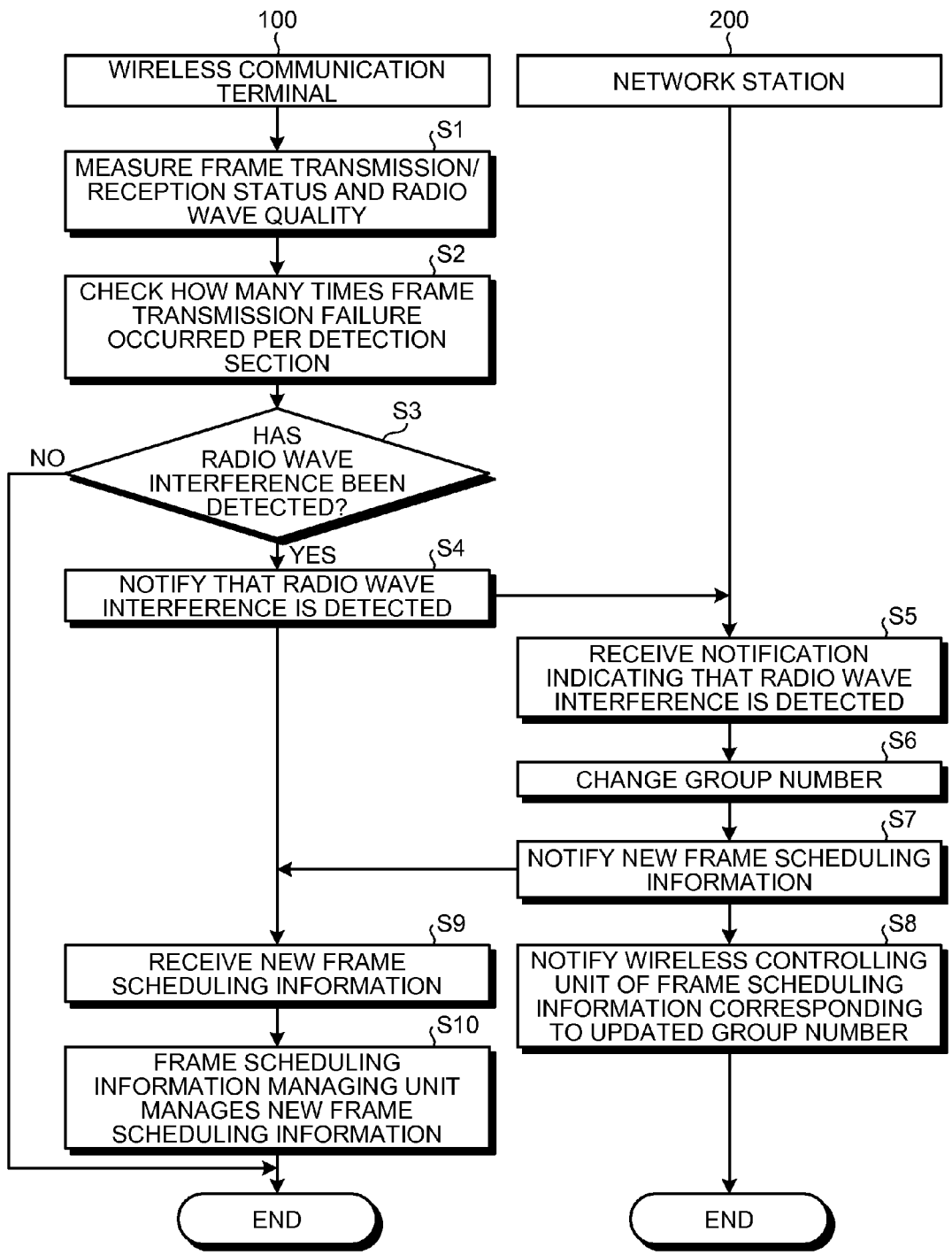
FIG. 7 is another exemplary flowchart of the processes performed between the apparatuses according to the first embodiment.

FIGS. 6 and 7 are exemplary flowcharts of processes performed between the apparatuses according to the first embodiment.

Processes Performed when the Wireless Communication Terminal 100 Belongs to the Network Station 200

As depicted in FIG. 6, when the power source of the wireless communication terminal 100 is turned on, a search is conducted for a network station so as to try to detect the network station 200 (step S1). When the network station 200 is detected (step S1: Yes), the frame scheduling information managing unit 113 included in the wireless communication terminal 100 checks all the wireless resources managed by the wireless resource managing unit 112 and, if there is a possibility of having a radio wave interference, the frame scheduling information managing unit 113 transmits a notification indicating that there is a possibility of having a radio wave interference, to the network station 200 (step S2).

Upon receipt of the notification indicating that there is a possibility of having a radio wave interference from the wireless communication terminal 100 belonging to the network station 200 (step S3), the terminal control information managing unit 213 included in the network station 200 registers into the terminal management table and manages: the terminal identifier (e.g., "0x005a"; see FIG. 4) of the wireless communication terminal 100 being the transmission source of the notification; the information "YES" indicating that there is a possibility of having a radio wave interference (see FIG. 4); and the arbitrary group number assigned to the wireless communication terminal 100 (e.g., the default value "0" assigned when the wireless communication terminal 100 belongs to the network station 200; see FIG. 4) (step S4).

Further, out of the frame scheduling table, the terminal control information managing unit 213 included in the network station 200 obtains the frame scheduling information (e.g., the ratio between the network side and the local side="1:1"; the frame with which the network station transmission is started is an "even-numbered frame"; and the number of times the frame transmission is continued is "1000"; see FIG. 5) that is kept in correspondence with the group number assigned to the wireless communication terminal 100 and transmits the obtained frame scheduling information to the wireless communication terminal 100 being the transmission source of the notification indicating that there is a possibility of having a radio wave interference (step S5).

After transmitting the frame scheduling information to the wireless communication terminal 100, the terminal control information managing unit 213 included in the network station 200 notifies the wireless controller 222 of the frame scheduling information transmitted to the wireless communication terminal 100 (step S6).

Upon receipt of the frame scheduling information from the network station 200 (step S7), the frame scheduling information managing unit 113 included in the wireless communication terminal 100 manages the received frame scheduling information (step S8).

Although not depicted in the drawings, the frame schedule controller 124 included in the wireless communication terminal 100 refers to the frame scheduling information managed by the frame scheduling information managing unit 113 and controls the transmission/reception timing of the frames that are transmitted/received by using the mutually-different wireless communication methods.

Processes Performed when a Radio Wave Interference is Detected by the Wireless Communication Terminal 100

As depicted in FIG. 7, the wireless device controller 121 included in the wireless communication terminal 100 measures the radio wave quality and the status of the frame transmissions/receptions of the wireless devices (step S1) and notifies the wireless measurement managing unit 111 of the measurement results.

Based on the measurement results provided by the wireless device controller 121, the wireless measurement managing unit 111 included in the wireless communication terminal 100 checks how many times a frame transmission failure occurred in the communication with the local-side device (e.g., a headset) per unit time period (e.g., 200 milliseconds) used as a predetermined detection section (step S2).

Further, the wireless measurement managing unit 111 included in the wireless communication terminal 100 compares the learned number of times the frame transmission failure occurred with the detection conditions and tries to detect a radio wave interference, if any (step S3). When a radio wave interference is detected (step S3: Yes), the wireless measurement managing unit 111 included in the wireless communication terminal 100 transmits a notification indicating that a radio wave interference is detected, to the network station 200 (step S4). On the contrary, when no radio wave interference is detected (step S3: No), the wireless measurement managing unit 111 included in the wireless communication terminal 100 ends the process without transmitting any notification indicating that a radio wave interference is detected, with respect to the measurement results at this time.

Upon receipt of the notification from the wireless communication terminal 100 indicating that a radio wave interference is detected (step S5), the terminal control information managing unit 213 included in the network station 200 refers to the terminal management table and changes the group number (e.g., "0") currently assigned to the wireless communication terminal 100 being the transmission source of the notification, to another group number (e.g., "2"; see FIG. 4) (step S6).

Further, out of the frame scheduling table, the terminal control information managing unit 213 included in the network station 200 obtains the frame scheduling information (e.g., the ratio between the network side and the local side="2:1"; the frame with which the network station transmission is started is an "even-numbered frame"; and the number of times the frame transmission is continued is "1000"; see FIG. 5) that is kept in correspondence with the new group number resulting from the change and transmits the obtained frame scheduling information to the wireless communication terminal 100 being the transmission source of the notification indicating that a radio wave interference is detected (step S7).

After transmitting the new frame scheduling information to the wireless communication terminal 100, the terminal control information managing unit 213 included in the network station 200 notifies the wireless controller 222 of the frame scheduling information transmitted to the wireless communication terminal 100 (step S8).

Upon receipt of the new frame scheduling information from the network station 200 (step S9), the frame scheduling information managing unit 113 included in the wireless communication terminal 100 manages the new frame scheduling information received (step S10).

Although not depicted in the drawings, the frame schedule controller 124 included in the wireless communication terminal 100 refers to the new frame scheduling information managed by the frame scheduling information managing unit 113 and controls the transmission/reception timing of the frames that are transmitted/received by using the mutually-different wireless communication methods.

Advantageous Effects of First Embodiment

As explained above, according to the first embodiment, when the network station 200 receives, from any of the wireless communication terminals 100 managed by the network station 200, a notification indicating that a radio wave interference is detected, the network station 200 changes the pieces of frame scheduling information currently assigned to the wireless communication terminal being the transmission source of the notification indicating that a radio wave interference is detected, to another piece of frame scheduling information. With this arrangement, it is possible to prevent radio wave interferences that may occur between wireless communication terminals when the wireless communication terminals each of which is configured so as to implement a plurality of wireless communication methods are positioned adjacent to each other.

[b] Second Embodiment

In the first embodiment above, the example is explained in which the piece of frame scheduling information currently assigned to the wireless communication terminal being the transmission source of the notification indicating that a radio wave interference is detected is changed to another piece of frame scheduling information; however the present invention is not limited to this example.

Figure 8:
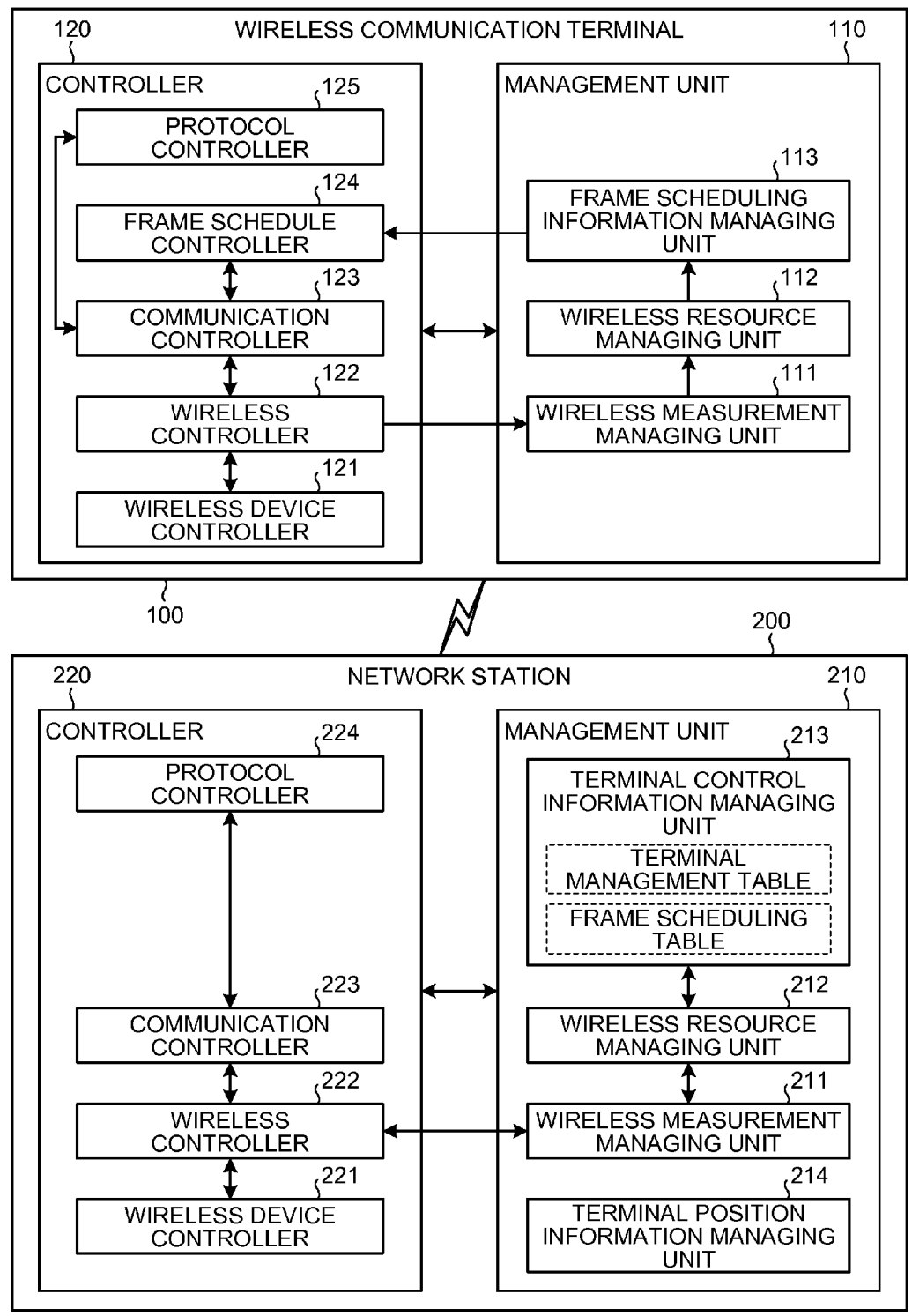
FIG. 8 is an exemplary diagram of apparatus configurations according to a second embodiment of the present invention.

For example, as depicted in FIG. 8, the network station 200 may further include, within the management unit 210, a terminal position information managing unit 214 that manages position information of each of the wireless communication terminals 100 managed by the network station 200. Further, upon receipt of the notification from any of the wireless communication terminals 100 indicating that a radio wave interference is detected, the terminal control information managing unit 213 refers to the position information managed by the terminal position information managing unit 214 and identifies another wireless communication terminal positioned near the wireless communication terminal 100 being the transmission source of the notification indicating that a radio wave interference is detected.

After identifying the other wireless communication terminal positioned near the wireless communication terminal 100 being the transmission source of the notification indicating that a radio wave interference is detected, the terminal control information managing unit 213 refers to the terminal management table and to the frame scheduling table and searches for the frame scheduling information assigned to the identified wireless communication terminal. Further, the terminal control information managing unit 213 transmits the same frame scheduling information as the frame scheduling information assigned to the identified wireless communication terminal, to the wireless communication terminal 100 being the transmission source of the notification indicating that a radio wave interference is detected.

Figure 9:
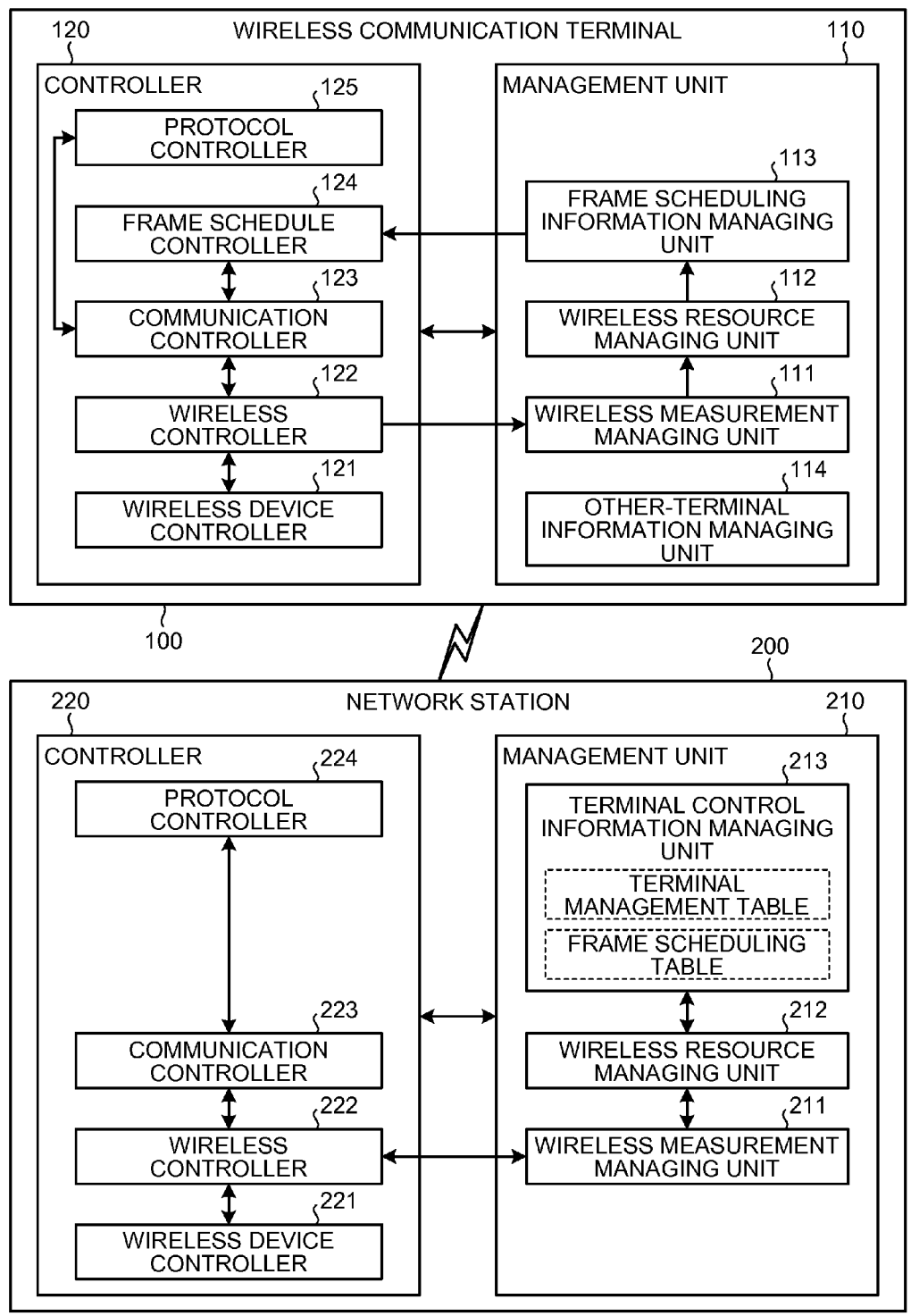
FIG. 9 is another exemplary diagram of apparatus configurations according to the second embodiment.

Further, together with the frame scheduling information, the network station 200 transmits, in advance, the group numbers registered in the terminal management table to each of the wireless communication terminals 100 managed by the network station 200. Further, as depicted in FIG. 9, the wireless communication terminal 100 further includes, within the management unit 110, an other-terminal information managing unit 114 that provides the group number of its own and that manages the group numbers provided by other wireless communication terminals positioned nearby.

Further, when the wireless measurement managing unit 111 detects a radio wave interference based on the measurement results provided by the wireless device controller 121, the wireless measurement managing unit 111 obtains, out of the other-terminal information managing unit 114, one or more group numbers provided by one or more wireless communication terminals positioned nearby, puts the obtained group numbers into the notification indicating that a radio wave interference is detected, and transmits the notification to the network station 200.

Upon receipt of the notification indicating that a radio wave interference is detected from the wireless communication terminal 100, the terminal control information managing unit 213 included in the network station 200 obtains the frame scheduling information corresponding to one of the group numbers included in the notification out of the frame scheduling table and transmits the obtained frame scheduling information to the wireless communication terminal 100 being the transmission source of the notification indicating that a radio wave interference is detected.

When the notification includes two or more group numbers, the terminal control information managing unit 213 included in the network station 200 adopts the group number assigned to the wireless communication terminal positioned nearest, by using, for example, the technique explained above with reference to FIG. 8. Further, the terminal control information managing unit 213 obtains the frame scheduling information corresponding to the adopted group number out of the frame scheduling table and transmits the obtained frame scheduling information to the wireless communication terminal 100 being the transmission source of the notification indicating that a radio wave interference is detected. FIGS. 8 and 9 are exemplary diagrams of the apparatus configurations according to the second embodiment.

Figure 10:
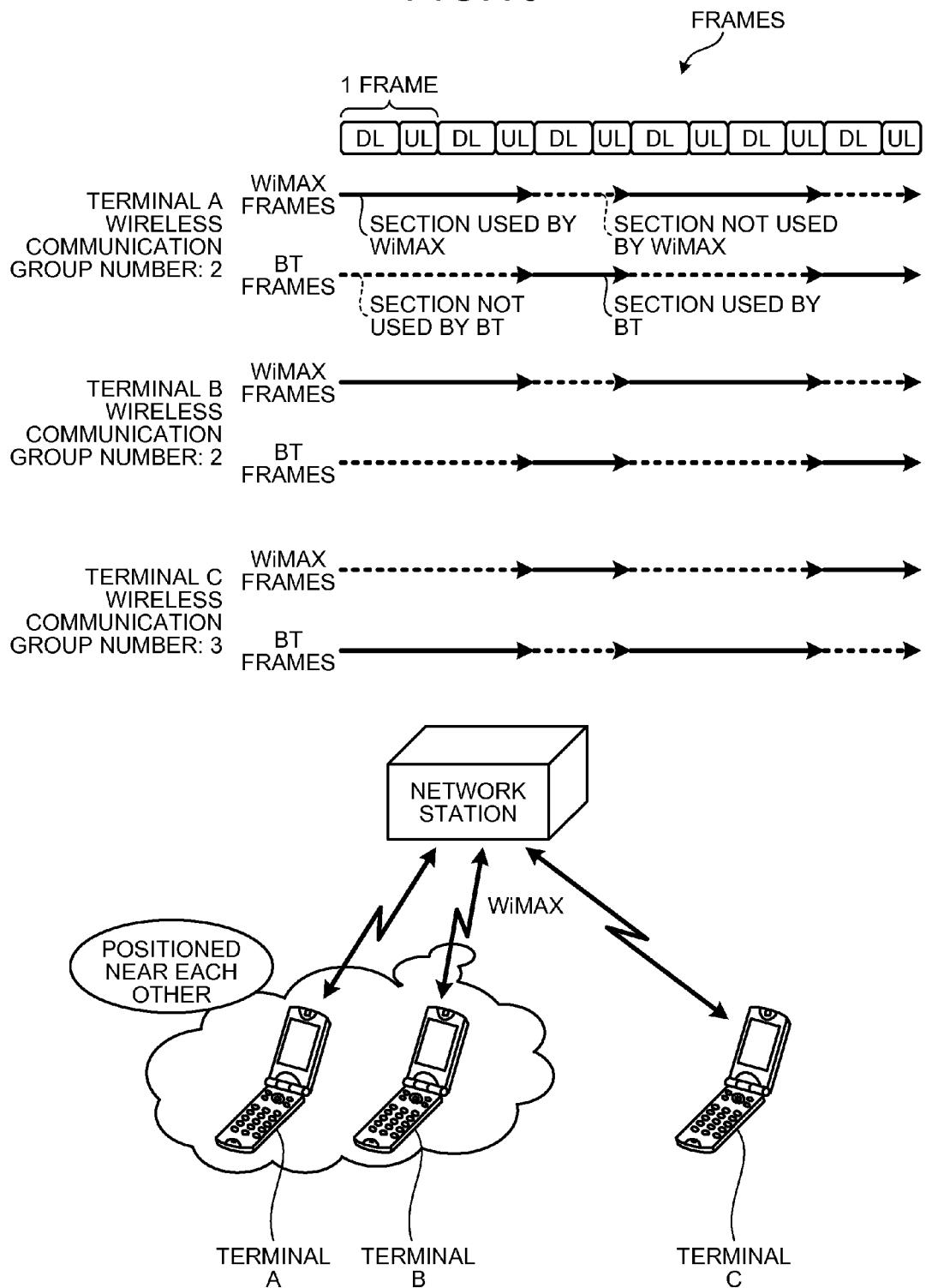
FIG. 10 is a drawing for explaining advantageous effects of the second embodiment.
Figure 11:
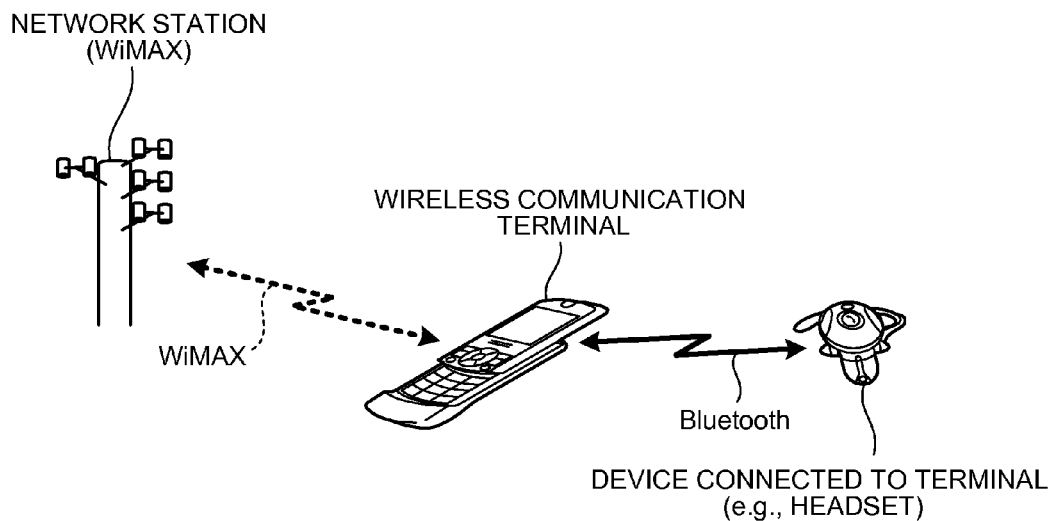
FIG. 11 is an exemplary configuration of a conventional wireless communication system.
Figure 12:
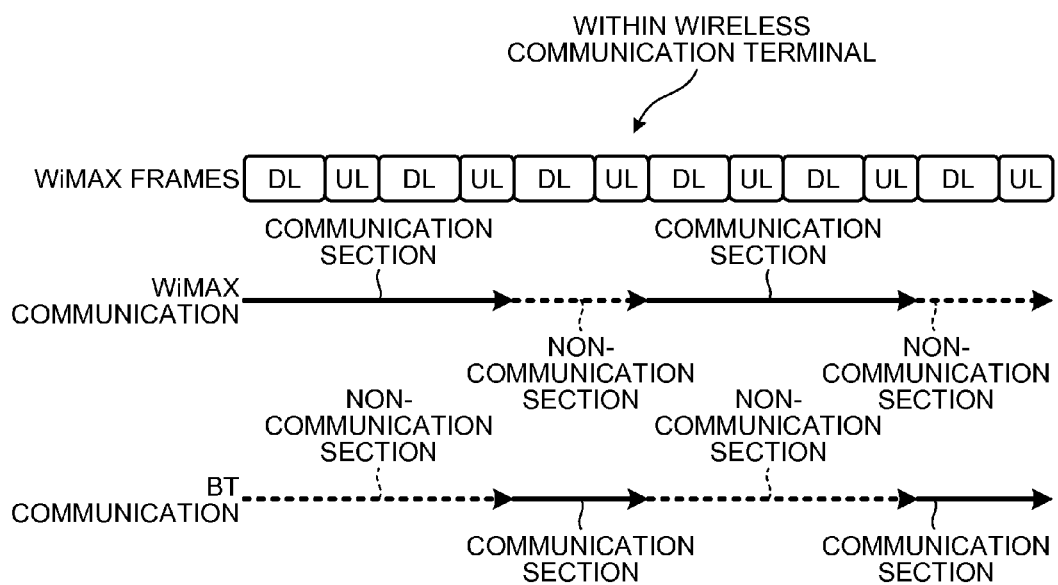
FIG. 12 is a scheduling example in which sections during which WiMAX communication is performed and sections during which Bluetooth communication is performed are time-shared.
Figure 13:
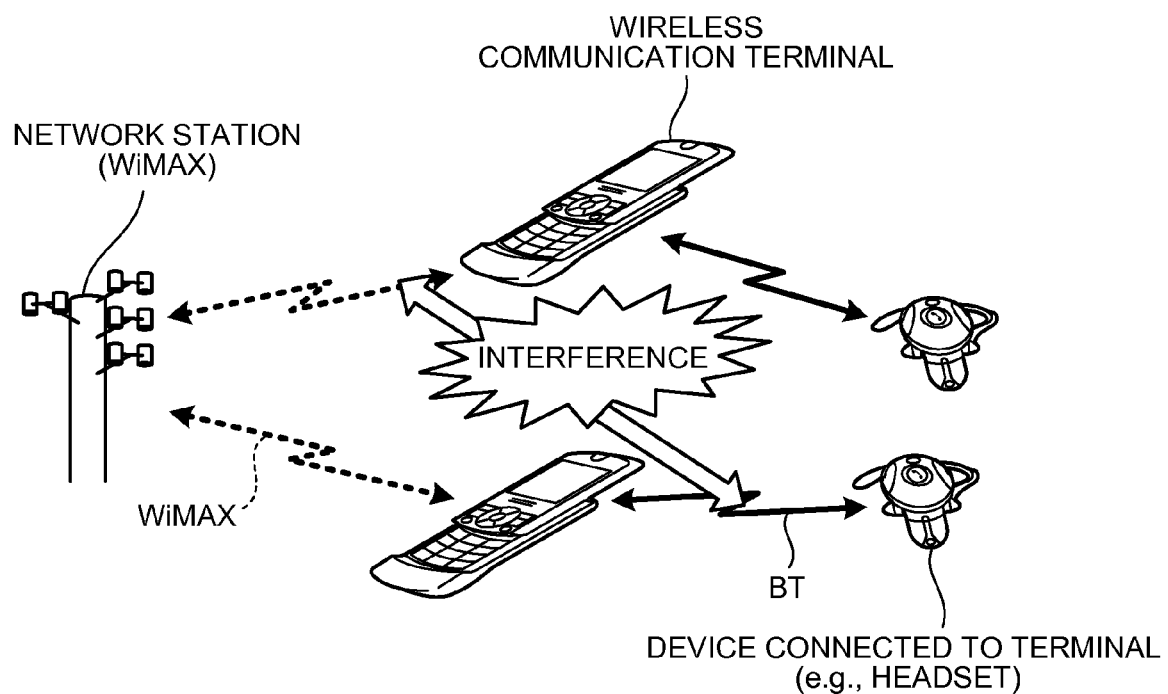
FIG. 13 is a drawing for explaining a problem with a conventional example.

With these arrangements, as depicted in FIG. 10, for example, a wireless communication terminal A and another wireless communication terminal B that are positioned near each other are able to transmit/receive frames by using mutually-different wireless communication methods such as WiMAX and Bluetooth (see "BT" in FIG. 10) according to mutually the same schedule (i.e., the schedule corresponding to the same group number "2"). Thus, it is possible to more efficiently prevent radio wave interferences that may occur between the wireless communication terminals. FIG. 10 is a drawing for explaining advantageous effects of the second embodiment.

[c] Third Embodiment

In the following sections, another one of the preferred embodiments of the network apparatus, the communication apparatus, the communication controlling method, and the communication controlling system will be explained.

(1) Apparatus Configurations and the Like

The constituent elements (the controller 220, the management unit 210, and the respective elements included in the controller 220, the management unit 210) of the network station 200 are depicted in FIGS. 2, 8, and 9 based on functional concepts and do not necessarily have to be physically configured in the manner depicted in FIGS. 2, 8, and 9. In other words, specific modes of distribution and integration of the network station 200 are not limited to the example depicted in FIGS. 2, 8, and 9. For example, another arrangement is acceptable in which the wireless device controller 221 and the wireless controller 222 are integrated together. As explained here, it is acceptable to functionally or physically distribute or integrate a part or all of the network station 200 in any arbitrary units, depending on various loads and the status of use. Further, the constituent elements of the network station 200 and all or any arbitrary part of the processing functions (e.g., see FIGS. 6 and 7) performed by the network station 200 may be realized by a Central Processing Unit (CPU) and a computer program analyzed and executed by the CPU or may be realized as hardware using wired logic.

Furthermore, the constituent elements (the controller 120, the management unit 110, and the respective elements included in the controller 120, the management unit 110) of the wireless communication terminal 100 are depicted in FIGS. 2, 8 and 9 based on functional concepts and do not necessarily have to be physically configured in the manner depicted in FIGS. 2, 8 and 9. In other words, specific modes of distribution and integration of the wireless communication terminal 100 are not limited to the example depicted in FIGS. 2, 8, and 9. For example, another arrangement is acceptable in which the wireless device controller 121 and the wireless controller 122 are integrated together. As explained here, it is acceptable to functionally or physically distribute or integrate a part or all of the wireless communication terminal 100 in any arbitrary units, depending on various loads and the status of use. Further, the constituent elements of the wireless communication terminal 100 and all or any arbitrary part of the processing functions (e.g., see FIGS. 6 and 7) performed by the wireless communication terminal 100 may be realized by a CPU and a computer program analyzed and executed by the CPU or may be realized as hardware using wired logic.

(2) Communication Controlling Method

It is possible to implement a communication controlling method as described below by using the network station 200 explained in the first embodiment above.

The communication controlling method is configured in such a manner that the network station 200 managing the wireless communication terminals 100 performs: a scheduling information assigning step (see, for example, step S4 in FIG. 6) of selecting one of a plurality of pieces of frame scheduling information out of a frame scheduling table including the plurality of pieces of frame scheduling information obtained by scheduling, in advance, transmission/reception timing of wireless frames that are transmitted/received by the wireless communication terminals 100 each of which is configured so as to implement a plurality of wireless communication methods, while using a wireless communication method corresponding to the network side and while using a wireless communication method corresponding to the local side, and assigning the selected piece of frame scheduling information to each of the wireless communication terminals 100 managed by the network station 200; a scheduling information notifying step (see, for example, step S5 in FIG. 6) of notifying each of the wireless communication terminals 100 of the piece of frame scheduling information assigned at the scheduling information assigning step; and a radio wave interference notification receiving step (see, for example, step S5 in FIG. 7) of receiving a notification from any of the wireless communication terminals 100 indicating that a radio wave interference is detected. When the notification indicating that a radio wave interference is detected is received at the radio wave interference notification receiving step, at the scheduling information assigning step another one of the pieces of frame scheduling information that is different from the piece of frame scheduling information currently assigned at the scheduling information assigning step to the wireless communication terminal 100 being the transmission source of the notification indicating that a radio wave interference is detected is selected out of the frame scheduling table, so that the selected piece of frame scheduling information is newly assigned (see, for example, step S6 in FIG. 7) to the wireless communication terminal 100 being the transmission source of the notification indicating that a radio wave interference is detected. At the scheduling information notifying step, the wireless communication terminal 100 being the transmission source of the notification indicating that a radio wave interference is detected is notified of the piece of frame scheduling information newly assigned at the scheduling information assigning step (see, for example, step S7 in FIG. 7).

An embodiment of the present invention is able to prevent radio wave interferences that may occur between wireless communication terminals when the wireless communication terminals each of which is configured so as to implement a plurality of wireless communication methods are positioned adjacent to each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network apparatus comprising:
    a scheduling information storage unit that stores therein a plurality of pieces of scheduling information for scheduling in advance transmission and reception timing of wireless frames that are transmitted and received by a plurality of communication apparatuses, the wireless frames including a wireless frame transmitted and received using a wireless communication method for a network side and a wireless frame transmitted and received using a wireless communication method for a local side;
    a scheduling information assigning unit that assigns one of the pieces of scheduling information stored in the scheduling information storage unit to a communication apparatus managed by the network apparatus;
    a scheduling information notifying unit that notifies the communication apparatus of the piece of scheduling information assigned by the scheduling information assigning unit; and
    a radio wave interference notification receiving unit that receives a notification indicating that a radio wave interference is detected from the communication apparatus, and scheduling identifying information together with the notification, the scheduling identifying information being exchanged among communication apparatuses positioned within a radio wave interference range and being for identifying the pieces of scheduling information assigned to the communication apparatuses, wherein
    when the radio wave interference notification receiving unit receives the notification indicating that the radio wave interference is detected, the scheduling information assigning unit selects another one of the pieces of scheduling information that is different from the piece of scheduling information currently assigned to the communication apparatus that has transmitted the notification, and newly assigns the selected piece of scheduling information to the communication apparatus that has transmitted the notification,
    the scheduling information notifying unit notifies the communication apparatus that has transmitted the notification of the piece of scheduling information newly assigned by the scheduling information assigning unit, and
    the scheduling information assigning unit selects one of the pieces of scheduling information that matches the scheduling identifying information received by the radio wave interference notification receiving unit and newly assigns the selected piece of scheduling information to the communication apparatus that has transmitted the notification.

2. The network apparatus according to claim 1, further comprising a communication apparatus identifying unit that identifies a communication apparatus positioned near the communication apparatus that has transmitted the notification, wherein
    the scheduling information assigning unit selects one of the pieces of scheduling information that is the same as a piece of scheduling information currently assigned to the communication apparatus identified by the communication apparatus identifying unit, and newly assigns the selected piece of scheduling information to the communication apparatus that has transmitted the notification.

3. A communication apparatus comprising:
    a radio wave interference transmitting unit that, when wireless communication quality on a local side satisfies a predetermined condition, transmits a notification indicating that a radio wave interference is detected, to a network apparatus, the radio wave interference transmitting unit transmitting scheduling identifying information together with the notification, the scheduling identifying information being exchanged among communication apparatuses positioned within a radio wave interference range and being for identifying the pieces of scheduling information assigned to the communication apparatuses; and
    a communication control unit that, based on scheduling information provided by the network apparatus, transmits and receives wireless frames using wireless communication methods for a network side and for the local side, wherein piece of scheduling information received from the network apparatus is newly assigned to the communication apparatus, the assigned piece of scheduling information is selected from among a plurality of pieces of scheduling information stored in by the network apparatus to match the scheduling identifying information transmitted by the radio wave interference transmitting unit.

4. A communication control method performed by a network apparatus, the network apparatus including a scheduling information storage unit that stores therein a plurality of pieces of scheduling information for scheduling in advance transmission and reception timing of wireless frames that are transmitted and received by a plurality of communication apparatuses, the wireless frames including a wireless frame transmitted and received using a wireless communication method for a network side and a wireless frame transmitted and received using a wireless communication method for a local side, the communication control method comprising:
    assigning one of the pieces of scheduling information stored in the scheduling information storage unit to a communication apparatus managed by the network apparatus;
    notifying the communication apparatus of the piece of scheduling information assigned at the assigning; and
    receiving a notification indicating that a radio wave interference is detected from the communication apparatus, and scheduling identifying information together with the notification, the scheduling identifying information being exchanged among communication apparatuses positioned within a radio wave interference range and being for identifying the pieces of scheduling information assigned to the communication apparatuses, wherein
    the assigning includes selecting, when the radio wave interference notification receiving unit receives the notification indicating that the radio wave interference is detected, another one of the pieces of scheduling information that is different from the piece of scheduling information currently assigned to the communication apparatus that has transmitted the notification, and newly assigning the selected piece of scheduling information to the communication apparatus that has transmitted the notification, the notifying includes notifying the communication apparatus that has transmitted the notification of the piece of scheduling information newly assigned at the assigning, and the selecting selects one of the pieces of scheduling information that matches the scheduling identifying information received by the radio wave interference notification receiving unit and newly assigns the selected piece of scheduling information to the communication apparatus that has transmitted the notification.

5. A communication controlling system comprising:

a plurality of communication apparatuses each configured to implement a plurality of radio communication methods; and a network apparatus configured to manage the plurality of communication apparatuses, wherein each of the communication apparatuses comprises a radio wave interference transmitting unit that, when wireless communication quality on a local side satisfies a predetermined condition, transmits a notification indicating that a radio wave interference is detected, to the network apparatus, the radio wave interference transmitting unit transmitting scheduling identifying information together with the notification, the scheduling identifying information being exchanged among communication apparatuses positioned within a radio wave interference range and being for identifying the pieces of scheduling information assigned to the communication apparatuses; and a communication control unit that, based on scheduling information provided by the network apparatus, transmits and receives wireless frames using wireless communication methods for a network side and for the local side, and the network apparatus comprises a scheduling information storage unit that stores therein a plurality of pieces of scheduling information for scheduling in advance transmission and reception timing of the wireless frames that are transmitted and received by the plurality of communication apparatuses, the wireless frames including a wireless frame transmitted and received using the wireless communication method for the network side and a wireless frame transmitted and received using the wireless communication method for the local side;

a scheduling information assigning unit that assigns one of the pieces of scheduling information stored in the scheduling information storage unit to a communication apparatus managed by the network apparatus;

a scheduling information notifying unit that notifies the communication apparatus of the piece of scheduling information assigned by the scheduling information assigning unit; and a radio wave interference notification receiving unit that receives a notification indicating that a radio wave interference is detected from the communication apparatus, and the scheduling identifying information together with the notification, the scheduling identifying information being exchanged among communication apparatuses positioned within a radio wave interference range and being for identifying the pieces of scheduling information assigned to the communication apparatuses, wherein when the radio wave interference notification receiving unit receives the notification indicating that the radio wave interference is detected, the scheduling information assigning unit selects another one of the pieces of scheduling information that is different from the piece of scheduling information currently assigned to the communication apparatus that has transmitted the notification, and newly assigns the selected piece of scheduling information to the communication apparatus that has transmitted the notification, the scheduling information notifying unit notifies the communication apparatus that has transmitted the notification of the piece of scheduling information newly assigned by the scheduling information assigning unit, and the scheduling information assigning unit selects one of the pieces of scheduling information that matches the scheduling identifying information received by the radio wave interference notification receiving unit and newly assigns the selected piece of scheduling information to the communication apparatus that has transmitted the notification.

* * * * *